Patented Nov. 10, 1931

1,830,835

UNITED STATES PATENT OFFICE

HANS GROTOWSKY, OF UERDINGEN, GERMANY, ASSIGNOR TO GENERAL ANILINE WORKS, INC., OF NEW YORK, N. Y., A CORPORATION OF DELAWARE

DYESTUFF OF THE TRIPHENYL METHANE SERIES

No Drawing. Application filed April 15, 1929, Serial No. 355,439, and in Germany April 17, 1928.

The invention relates to new dyestuffs of the triphenyl methane series.

I have found that by reacting with α- or β-chloro ethyl benzene upon primary or secondary aromatic amines there are obtained new secondary or tertiary aromatic amines containing the group $-[C_2H_4].C_6H_5$ attached to the nitrogen ($[C_2H_4]$ being either an ethylene group $-CH_2.CH_2-$ or an ethylidene group $CH_3.CH=<$). These amines or the sulfonic acids thereof yield by condensation with aromatic aldehydes, ketones or hydrols and, if necessary, by subsequent oxidation new dyestuffs of the triphenyl methane series.

For example by heating a mixture of 2 moles of monethyl aniline and 1 mole of β-chloro-ethyl benzene to about 100° C. there results ethyl β-phenyl-ethyl aniline corresponding to the formula

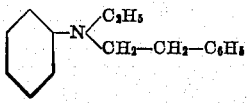

which is an oil boiling from 195 to 200° C. at a pressure of 20 mm. (mercury gauge). In quite an analogous way there is obtained from o-toluidine and α-chloroethyl benzene mono-α-methylbenzyl o-toluidine

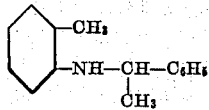

which boils from 182 to 186° C. at 20 mm. pressure (mercury gauge) and melts at 38 to 40° C.

These and all the other aromatic amines containing the group $-[C_2H_4]-C_6H_5$ can be sulfonated in accordance with the well-known methods such as for example by dissolving them in a small amount of concentrated sulfuric acid and adding fuming sulfuric acid containing about 65 percent of sulfur trioxide at about 30-50° C. The sulfonic acids thus obtained are partly resinous bodies, partly they represent well-defined crystalline compounds.

By condensing the amines sulfonated or not sulfonated with aldehydes, such as benzaldehyde and the substitution products thereof, or hydrols, such as tetra-methyl diamido benzhydrol, there result leuco acids or leuco bases which are readily oxidized to the corresponding dyestuffs. The latter are directly produced by condensing the amines with ketones, such as Michler's ketone.

The new triphenyl methane dyestuffs—in particular if they are acid dyestuffs containing a sulfo group—are distinguished by an excellent clarity of shade which is different from the tint of the corresponding dyestuffs produced from benzylated aromatic amines, such as formyl violet (Colour Index No. 698).

The invention is illustrated by the following examples. The parts are by weight.

Example 1

270 parts of Michler's ketone and 225 parts of ethyl α-methylbenzyl aniline (boiling from 174 to 178° C. at 20 mm. pressure) are melted together with phosphorus oxychloride at about 90 to 95° C. After decomposing the melt by water or sodium chloride solution there is obtained an a-methylbenzyl violet which has a slightly more reddish shade than benzyl violet (Colour Index No. 697). It is believed to correspond to the formula:

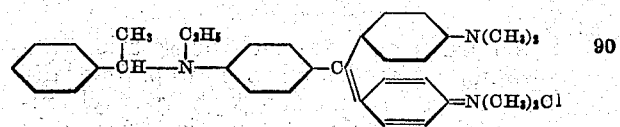

Example 2

140 parts of o-chloro benzaldehyde and 582 parts of α-methylbenzyl o-toluidine sulfonic acid (obtained by sulfonating the aforesaid amine by means of fuming sulfuric acid containing about 65 percent of sulfur trioxide at a temperature of 30-40° C.) are heated together with about 250 parts of water at a temperature of 100° C., until the aldehyde has disappeared. 145 parts of the resulting leuco acid are dissolved in 21 parts of sodium carbonate and 2500 parts of water and oxidized by means of lead dioxide or sodium bichromate and sulfuric acid in the known way. The dyestuff is precipitated by pouring the reaction mixture into sodium chloride solution and purified by dissolving it in hot water and cooling down the solution.

The dyestuff thus obtained has the probable formula:

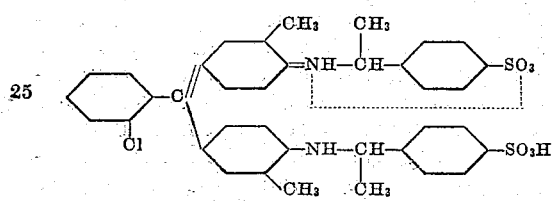

It is, after drying, a violet powder which dyes wool from an acid bath more bluish shade than the corresponding dyestuff from o-chloro benzaldehyde and benzyl o-toluidine. Moreover, the leuco compound of the new dyestuff is much more readily oxidized than that of the dyestuff from benzyl o-toluidine.

*Example 3*

By substituting o-chloro benzaldehyde in Example 2 by 190 parts of o-sulfo benzaldehyde a corresponding leuco acid is obtained. On oxidizing it in the same way as shown in Example 2 there results a dyestuff which is a violet powder and dyes wool from an acid bath blue. It has the probable formula:

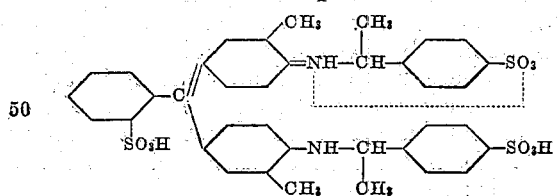

*Example 4*

100 parts of formaldehyde solution (30 percent) are condensed with 610 parts of the sulfonic acid from ethyl β-phenylethyl aniline (obtained by sulfonating the said amine by means of fuming sulfuric acid containing 65 percent of sulfur trioxide at a temperature of 30 to 40° C.). 612 parts of the resulting derivative of diphenyl methane are heated together with 149 parts of diethyl aniline and the twentyfold amount of water at 70° C., cooled down to 40° C. and mixed with such an amount of sodium bichromate as corresponds to 134 parts of chromium trioxide. There is obtained a dyestuff which is a reddish violet powder and which dyes wool from an acid bath considerably more bluish and clearer shade than the corresponding dyestuff from diphenyl methane derivative produced from formaldehyde and ethyl benzyl aniline sulfonic acid and diethyl aniline (formyl violet, Colour Index No. 698). The new dyestuff corresponds probably to the formula:

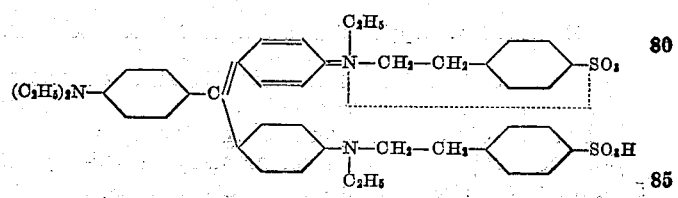

I claim:

1. Process which comprises condensing an aromatic amine containing a group $-[C_2H_4]-C_6H_5$ attached to the nitrogen with a compound of the group consisting of aromatic aldehydes, ketones and hydrols and converting the leuco compound into a dyestuff.

2. Process which comprises condensing a sulfonated aromatic amine containing a group $-[C_2H_4]-C_6H_5$ attached to the nitrogen with a compound of the group consisting of aromatic aldehydes, ketones and hydrols and converting the leuco compound into a dyestuff.

3. Process which comprises reacting with an ethyl benzene containing chlorine in the ethyl side chain upon a non-tertiary aromatic amine, condensing the aralkylated amine with a compound of the group, consisting of aromatic aldehydes, ketones and hydrols and converting the leuco compound into a dyestuff.

4. Process which comprises reacting with β-chloroethyl benzene upon a non-tertiary aromatic amine, condensing the phenylethylated amine with an aromatic carbonyl compound and oxidizing the leuco compound to a dyestuff.

5. New dyestuffs of the triphenyl methane series corresponding to the general formula

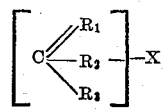

(wherein $R_1$, $R_2$ and $R_3$ are phenyl radicals and X represents a sulfo group or an unsubstituted nuclear hydrogen atom) containing at least one amino group substituted by a group $-[C_2H_4]-C_6H_5$ attached to the nitrogen atom.

6. New acid dyestuffs of the triphenyl methane series corresponding to the general formula

(wherein $R_1$, $R_2$, and $R_3$ are phenyl radicals) containing a sulfo group and at least one amino group substituted by a group $-[C_2H_4]-C_6H_5$ attached to the nitrogen atom.

7. New acid dyestuffs of the triphenyl methane series corresponding to the general formula

(wherein $R_1$, $R_2$ and $R_3$ are phenyl radicals) containing a sulfo group and at least one amino group substituted by a phenyl ethyl group $-CH_2.CH_2-C_6H_5$ attached to the nitrogen atom.

8. A new acid dyestuff of the triphenyl methane series probably corresponding to the formula

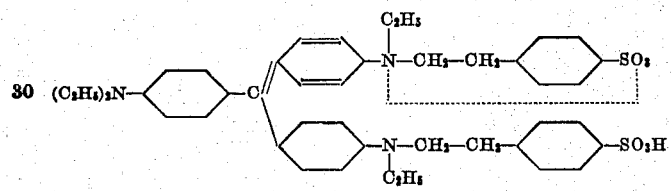

which is in a dry state a reddish violet powder and dyes wool from an acid bath bluish violet shades.

In testimony whereof I have hereunto set my hand.

HANS GROTOWSKY.